(12) United States Patent
Currle et al.

(10) Patent No.: US 6,805,624 B2
(45) Date of Patent: Oct. 19, 2004

(54) AIR OUTLET NOZZLE AND METHOD OF MAKING AND USING SAME

(75) Inventors: Joachim Currle, Stuttgart (DE); Frank Fruehauf, Aichwald (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/428,150

(22) Filed: May 2, 2003

(65) Prior Publication Data

US 2004/0033776 A1 Feb. 19, 2004

(30) Foreign Application Priority Data

May 2, 2002 (DE) .......................................... 102 19 696

(51) Int. Cl.⁷ .................................................. B60H 1/34
(52) U.S. Cl. ........................................ 454/152; 454/143
(58) Field of Search .................................. 454/143, 152, 454/75, 155, 313

(56) References Cited

U.S. PATENT DOCUMENTS

| | | | | |
|---|---|---|---|---|
| 184,955 A | * | 12/1876 | Condon | 114/177 |
| 261,476 A | * | 7/1882 | Neracher | 126/316 |
| 2,367,104 A | * | 1/1945 | Demuth | 454/312 |
| 2,558,421 A | * | 6/1951 | Daninhirsch | 454/302 |
| 3,000,291 A | * | 9/1961 | Zsarnoti | 454/334 |
| 3,082,676 A | * | 3/1963 | Church | 454/303 |
| 3,299,797 A | * | 1/1967 | Dry | 454/295 |
| 3,554,111 A | * | 1/1971 | Traver et al. | 454/303 |
| 3,600,856 A | * | 8/1971 | Burn | 49/324 |
| 3,732,799 A | * | 5/1973 | Spoormaker | 454/266 |
| 3,765,316 A | * | 10/1973 | Skoch | 454/292 |
| 3,799,046 A | * | 3/1974 | Gorchev | 454/334 |
| 4,383,477 A | * | 5/1983 | Nilsson et al. | 454/274 |
| 4,690,372 A | * | 9/1987 | Thiebaud | 251/129.1 |
| 4,800,804 A | * | 1/1989 | Symington | 454/257 |
| 5,249,602 A | * | 10/1993 | Sandor et al. | 137/625.33 |
| 5,333,835 A | * | 8/1994 | Smith et al. | 251/129.12 |
| 5,340,358 A | | 8/1994 | Halupczok et al. | |
| 5,800,259 A | * | 9/1998 | Olney | 454/109 |
| 5,890,958 A | * | 4/1999 | Greiner et al. | 454/155 |
| 6,149,513 A | * | 11/2000 | Lyu | 454/152 |
| 6,527,194 B1 | * | 3/2003 | Burke | 236/49.3 |

FOREIGN PATENT DOCUMENTS

GB    624932    6/1949

* cited by examiner

Primary Examiner—Derek S. Boles
(74) Attorney, Agent, or Firm—Crowell & Moring LLP

(57) ABSTRACT

An air outlet nozzle of a heating and/or air-conditioning system of a vehicle is provided. It has a displacer which is connected to a nozzle mouth element mounted displaceably in the nozzle housing. In order, with as little structural space as possible and as little flow losses as possible, to be able to control the diffusivity of the air jet emerging from the air outlet nozzle, the flow resistance and the axial position of the displacer can be adjusted.

33 Claims, 3 Drawing Sheets

AIR OUTLET NOZZLE AND METHOD OF MAKING AND USING SAME

BACKGROUND AND SUMMARY OF THE INVENTION

This application claims the priority of German Patent Document 102 19 696.6, filed May 2, 2002, the disclosure of which is expressly incorporated by reference herein.

The invention relates to an air outlet nozzle for a ventilation system, comprising a nozzle housing which has an outlet mouth, a nozzle mouth element and a displacer which is arranged in an airflow in a mouth region and is connected to the nozzle mouth element.

In the case of ventilation devices for vehicles, air outlet nozzles are in practice used with control devices which enable the emerging air jet to be controlled in a specific manner. It is endeavoured here also to control the spreading of the jet in addition to the direction of the air jet. It has been demonstrated that temperature regulation which is more efficient in terms of energy than a focussed air jet can thus be obtained.

Experience has shown that a vehicle occupant diverts a focussed and temperature-regulated air jet away from himself after a certain time, in order to avoid unpleasant drafts. This means that the heating and cooling power has to be increased in order to provide a pleasant temperature for the occupant, since the air jet does not directly heat or cool the occupant, but rather primarily heats or cools other objects in the vehicle. If, in contrast, the occupant has a diffuse air jet aimed directly at him, then draughts are avoided and the heating and cooling power can be reduced.

European Patent Document EP 0 324 770 B1 discloses an air outlet nozzle which has three air-guiding louvres which can be displaced with respect to one another. The air-guiding louvres are arranged in the air exit plane of the air outlet nozzle, one air-guiding louvre being connected fixedly to the nozzle and two of the louvres being displaceable parallel to the fixedly mounted air-guiding louvre. Displacement of the air-guiding louvres causes air-guiding surfaces differing in inclination to be formed, with the result that the exit direction of the air jet can be controlled. It is disadvantageous here that the air-guiding louvres have a high flow resistance and that only the air exit direction, but not the spreading of the air jet, can be controlled.

German Patent Document DE 41 39 099 C2 and corresponding U.S. Pat. No. 5,340,358 discloses an air outlet which has a rotationally symmetrical housing and a rigid baffle plate. The latter is arranged in a fixed position in the outlet cross section of the air outlet. Swirl vanes are arranged in a radially circulating manner in the interior of the housing. Axial displacement of the swirl vanes within the air outlet enables the diffusivity of the emerging air jet to be controlled. The high flow obstruction caused by the swirl vanes, which results in large losses, is disadvantageous here.

German Patent Document DE 196 12 764 C2 shows an air outlet having swirl vanes arranged in a fixed position in the air exit plane. An axially displaceable air-guiding pipe for changing the diffusivity of the emerging airflow is arranged in the interior of the air outlet. High flow losses as a consequence of the large flow obstruction also occur here.

British Patent Document GB 624,932 shows an air outlet nozzle having a fixed baffle plate and a housing having a radial inlet. Air-guiding elements are arranged in an axially adjustable manner in the interior of the housing. Depending on the axial position of the air-guiding elements, the latter, together with the baffle plate, divert the air flowing radially into the nozzle housing by between 180 and 90 degrees, with the result that the air exits in a manner adjusted radially or axially. A disadvantage here is the relatively large structural volume of the air nozzle which is caused by the radial air entrance direction. Also, the flow resistance of this air outlet nozzle is relatively high as a consequence of the air being deflected.

The present invention has an aspect of providing an air outlet nozzle which is of compact design and in which the air jet can be adjusted in diffusivity, and which has a large obtainable spreading of the air jet with low flow losses. The air outlet nozzle is intended preferably to be simple and/or comfortable to operate and is intended not to make much noise.

This aspect may be achieved in that a position of the displacer is suitable in an axial direction relative to the outlet mouth by the displacer being displaceable from a position in the outlet mouth into a position outside the nozzle housing, and wherein the displacer has an adjustable flow obstruction.

A displacer, which can be displaced axially, i.e. can be displaced in the direction of the central longitudinal axis of the air outlet nozzle, is arranged in the mouth region of the air outlet nozzle and has an adjustable flow obstruction. The displacer can be arranged in the mouth region of the air nozzle, in the air outlet plane thereof, or else can be brought outwards out of the mouth region, so that it is arranged outside the nozzle housing. Interaction of the position of the displacer relative to the air exit plane, on the one hand, and of the adjustable flow obstruction of the displacer, on the other hand, enables the flow and pressure ratios in the mouth region of the air outlet nozzle or downstream of the mouth region to be controlled in a specific manner. This results in the airflow emerging from the air outlet nozzle can be controlled in its spreading of the jet and in its diffusity and/or direction. The flow obstruction caused by the displacer and therefore the flow losses which occur are small, since, in the case of a large displacement effect or flow obstruction, the displacer is arranged outside the nozzle housing.

Provision is made, for the flow characteristics of the displacer to be changed by changing its cross section and/or shape. For this purpose, the displacer can have pivotable slats which are preferably arranged in the shape of a V or annularly. Adjustment of the slats causes the shape or the cross section of the displacer to be changed.

In one embodiment of the invention, the displacer may have an elastic membrane which interacts with the slats or with the bars or bar-shaped slats and forms a rounded outer contour of the displacer. In this case, the entire outer contour or individual boundary surfaces of the displacer can be formed by the elastic membrane.

Another embodiment of the invention provides an air-permeable displacer, the air permeability of which can be adjusted. The air permeability can be adjusted in such a manner that the displacer has minimal flow resistance, i.e. maximal air permeability, in the position in which it is not drawn out, i.e. in the region of the mouth plane, and/or maximal flow resistance, i.e. minimal air permeability, in the drawn-out position, i.e. outside the nozzle housing.

The displacer may, in order to make different flow profiles possible, have air permeability which is homogeneous over its cross section or inhomogeneous air permeability.

In order to control the exit direction of the air jet, provision may be made for the displacer to have inhomogeneous air permeability, i.e. differing air permeability in locally delimited areas. The displacer may preferably have a plurality of laminated perforated plates with the pattern of holes differing or louvres with differing pitch, with the result that, depending on the position of the perforated plates or louvres with respect to one another, locally different air permeability can be set. As a result, it is possible to deflect the air jet in a specific direction. Also, by controlling the inhomogeneous air permeability of the displacer, a temporally changeable, preferably periodic control of the exit direction of the air jet is possible. Tilting of the displacer relative to the air exit cross section likewise makes directional setting of the emerging air jet possible.

Yet another embodiment of the invention makes provision for the displacer to be connected to a nozzle mouth element which can be drawn axially out of the nozzle housing. The side walls of the nozzle mouth element have cutouts for the radial exit of air, with the result that only a small flow impediment occurs, if at all. Provision is made for the nozzle mouth element to have basically the same cross section and/or diameter as the nozzle housing, with it being possible for the cross section and/or diameter of the nozzle mouth element to be slightly larger or smaller than that of the nozzle housing, so that the walls of the nozzle mouth element bear inside or outside the nozzle housing in a form-fitting, shapewise or congruent manner on the side walls thereof.

The nozzle mouth element may also be mounted in an axially displaceable manner via guide rails arranged on the side walls of the nozzle housing. Similarly, a central guide rail arranged centrally in the nozzle housing may be provided.

In a structurally simple embodiment, the displacer may be arranged in a fixed position outside the nozzle housing or in the outlet mouth.

One advantageous embodiment makes provision for the nozzle housing to have an adjusting device. The adjusting device may have mechanical and/or electric and/or mechatronic actuators for adjusting the position and/or shape and/or cross section and/or air permeability of the displacer. In particular, the adjusting device can be operated mechanically and/or automatically, preferably can be remote-controlled, so that the outlet direction and/or diffusivity of the air jet can be controlled manually via the adjusting device and/or after a preselectable program sequence or time lapse.

The air exit nozzle is provided, in particular, for use in heating and/or air conditioning and/or ventilation systems for vehicles. Particularly in the case of passenger vehicles, there is the desire to control the air exit of the heating and/or air-conditioning system in such a manner that, in addition to a directed air exit at high speed, a diffuse air exit at low speed can be set, in order, for example, to avoid unpleasant drafts. In this case, the air outlet nozzle must be comfortable, i.e. must make as little noise as possible, and is to take up as little structural space as possible.

Further features and embodiments of the invention emerge from the claims, the figures and the description of the figures. The features and combinations of features mentioned above and presented in the following text can be used not only in the respectively stated combination, but also in other combinations or on their own without departing from the scope of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
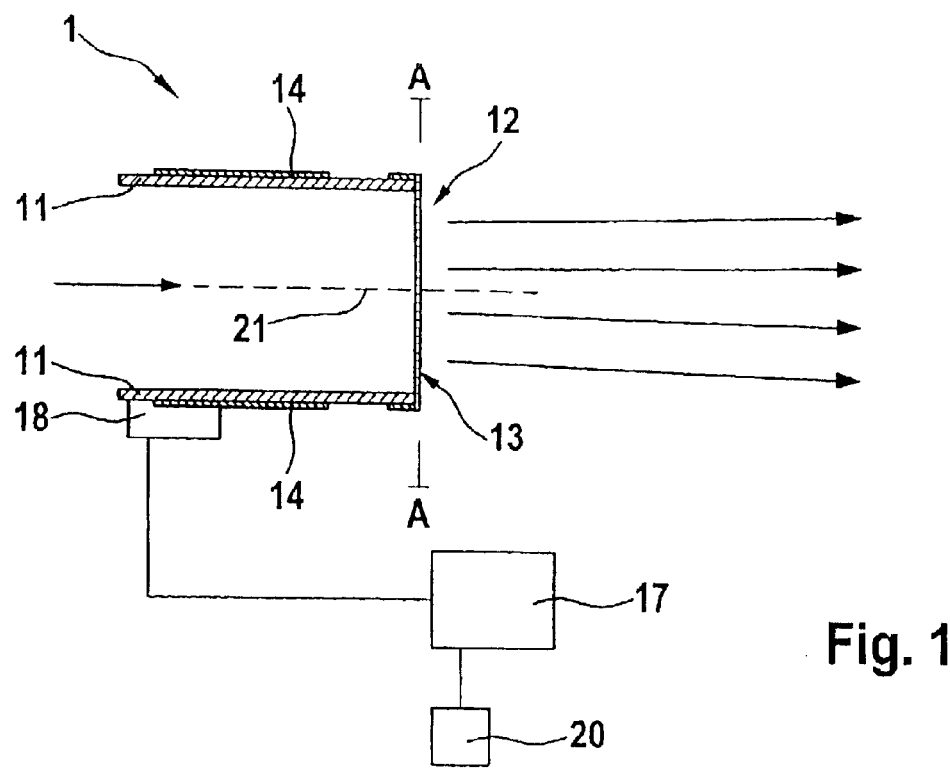
FIG. 1 shows a schematic illustration of an air outlet nozzle with a focused air jet.
Figure 2:
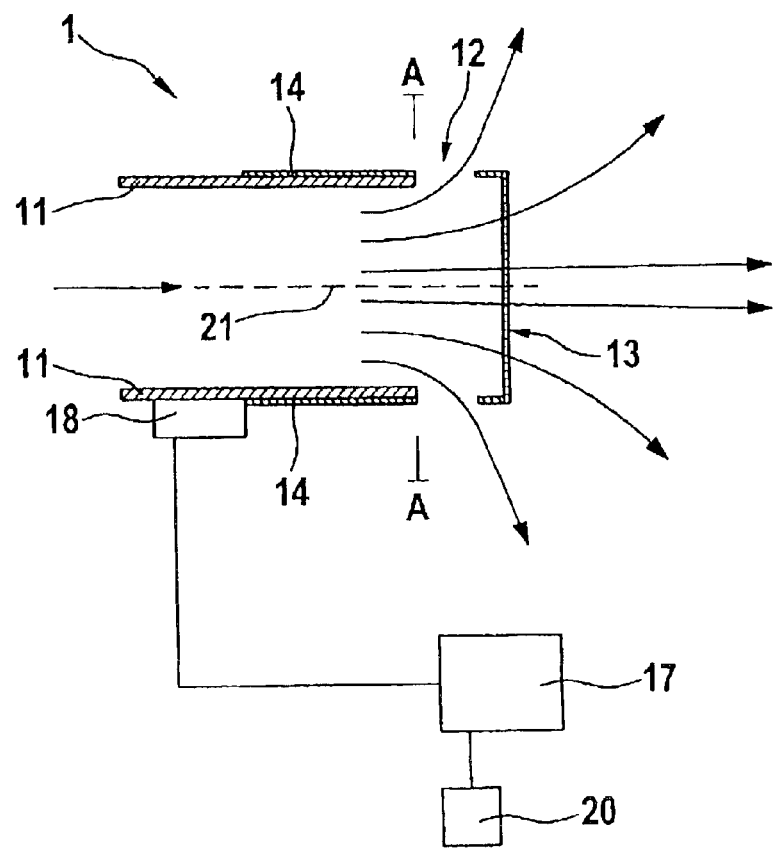
FIG. 2 shows a schematic illustration of the air outlet nozzle with a diffuse air jet.

In FIGS. 1 and 2, an air outlet nozzle 1 is shown schematically. The air outlet nozzle 1 can be designed as an air outlet nozzle of a heating and/or air-conditioning system of a passenger vehicle, installed, for example, in the cockpit region or in a central console.

The air outlet nozzle 1 has a housing 11 which is arranged at the end of an air duct or an air-distributing system. At that side of the housing 11 which lies downstream, the air outlet nozzle 1 has an outlet mouth 12 with a displacer 13. The displacer 13 is connected to a nozzle mouth element 14. The central longitudinal axis 21 of the air outlet nozzle is shown by dashed lines and runs approximately at right angles to the mouth plane, which runs along the line A—A.

The nozzle mouth element 14 has side walls which have a cross section which is shaped identically to the housing 11, with slightly larger dimensions. The side walls of the nozzle mouth element 14 therefore surround the housing 11 in a form-fitting manner and are mounted in an axially displaceable manner on it. The nozzle mouth element 14 can thus be displaced, together with the displacer 13 fastened to it, forwards, for example into a vehicle passenger compartment. In the front section directed towards the displacer 13, the side walls of the nozzle mouth element 14 have cutouts which enable air to flow through in an as unimpeded manner as possible in the radial direction, predominantly.

A driving device 18 engages between the nozzle housing 11 and the nozzle mouth element 14 in order to displace the nozzle mouth element and/or to control the air permeability of the displacer 13, with the result that the characteristics of the air outlet nozzle can be changed in an automatically driven manner. The driving device 18 is connected to a control device 17 which has a control element 20 for manually controlling the air outlet nozzle 1. In addition to the manual operation, the control device 17 can also activate the air outlet nozzle 1 in a manner controlled by program sequence or controlled by time, with the result that the air jet emerging from the air outlet nozzle 1 can be controlled automatically using preselectable programs or time lapses. The air outlet nozzle 1 can be controlled by the control device 17 in such a manner that the air jet optimally corresponds to the demands of a heating and/or cooling phase of a connected heating and/or air-conditioning system. To this end, it is possible to connect the control device 17 to an automatic air-conditioning system or to integrate it into such a system.

In FIG. 1, the displacer 13 is shown with the nozzle mouth element 14 in a pushed-in position, so that the displacer 13 ends flush with the housing 11. The cutouts in the side walls of the nozzle mouth element 14 are concealed by the nozzle housing 11. In this position, the air jet, indicated by arrows in the figures, exits in a focused manner in the axial direction out of the air outlet nozzle 1. The flow resistance of the displacer 13 is set to the minimum for maximum throughput in terms of the amount of air.

In FIG. 2, the displacer 13 is shown with the nozzle mouth element 14 in a position displaced with respect to the passenger compartment, i.e. offset downstream out of the mouth region 12 of the air outlet nozzle 1. The displacer 13 closes off the nozzle mouth element 14 from the passenger compartment. The cutouts of the nozzle mouth element 14 are now no longer concealed by the side walls of the nozzle housing 11, but rather can have flow passing freely through them, so that the air flow emerging from the air outlet nozzle 1 can emerge through the same in an approximately radial direction. In this position, the air jet exits in a diffuse manner.

The air permeability of the displacer 13 enables the expansion of the jet to be controlled in such a manner that different amounts of air flow through the displacer, on the one hand, and the cutouts, on the other hand. Two partial air flows are obtained for the diffuse air flow, the ratio of which partial air flows determines the diffusivity of the air flow. This ratio can be set by the variables of the position and/or flow obstruction of the displacer in conjunction with the cross section and the arrangement of the cutouts.

If the cutouts in the side walls of the nozzle mouth element 14 have a comparable cross-sectional surface to the nozzle cross section itself, scarcely any additional losses arise, even at maximum expansion of the jet, in comparison with a known type of air nozzle which can have flow passing freely through it. This expansion of the jet in combination with low losses in pressure enables the air outlet nozzle 1 to have, in principle, flow properties of an air outlet nozzle having a substantially larger cross section, thereby resulting de facto in an enlargement of the nozzle cross section with the nozzle dimensions remaining the same.

Figure 3:
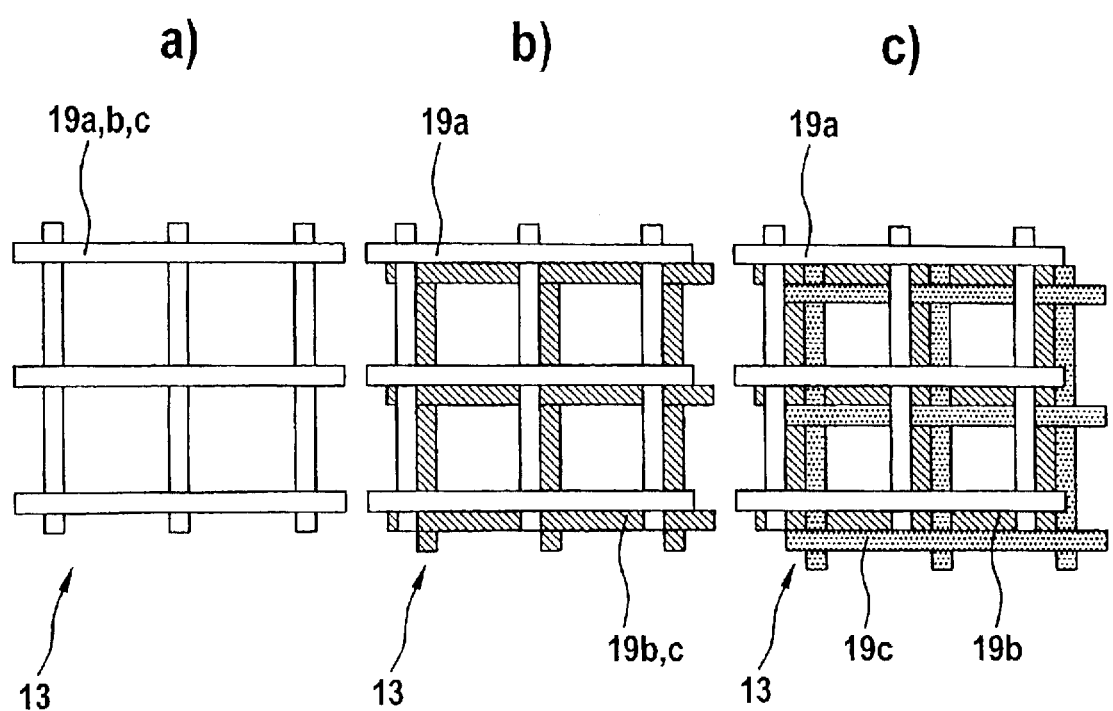
FIGS. 3A–C show schematic illustrations of a displacer with adjustable air permeability.

FIG. 3C shows an example of the displacer 13 having three louvres 19a, 19b, 19c arranged one behind another in the direction of flow. The individual louvres 19a, 19b and 19c are arranged parallel to one another and designed in a manner such that they can be displaced relative to one another. FIG. 3a shows the louvre arrangement having the smallest flow obstruction, i.e. the greatest air permeability of the displacer 13, as used, for example, in the case of a focused air jet. All three louvres 19a, 19b and 19c are arranged in alignment one behind another, with the result that a maximum surface through which flow can pass freely is produced between the louvre struts. FIG. 3c shows the louvre arrangement with the greatest flow obstruction, i.e. with the lowest air permeability, of the displacer, as is used, for example, in the case of a diffuse air jet. All three louvres are arranged offset with respect to one another, with the result that only a small surface through which flow can pass freely is produced between the louvre struts. An intermediate position having air permeability lying between the maximum and minimum value is shown in FIG. 3b.

Figure 4:
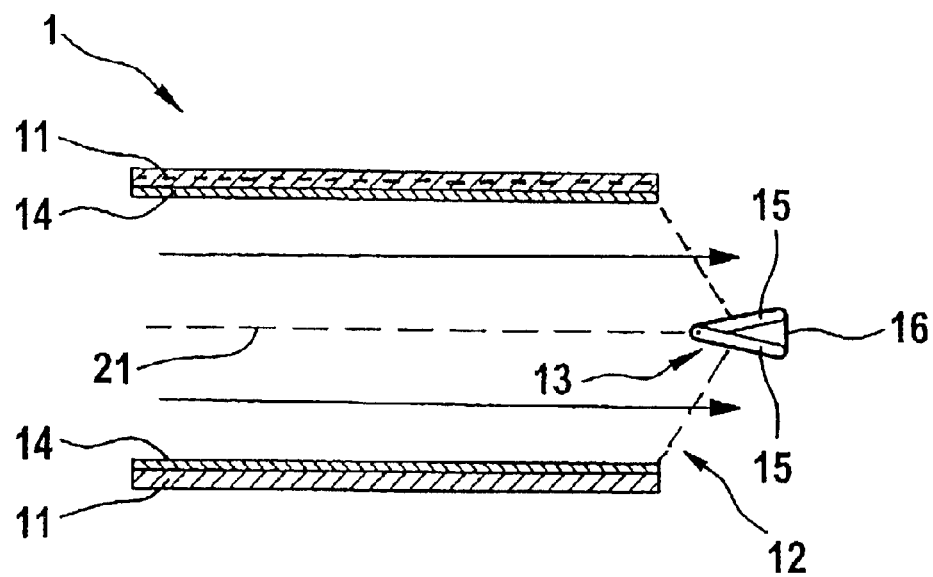
FIG. 4 shows a schematic illustration of an air outlet nozzle with a displacer which can be changed in shape and with a focused air jet.
Figure 5:
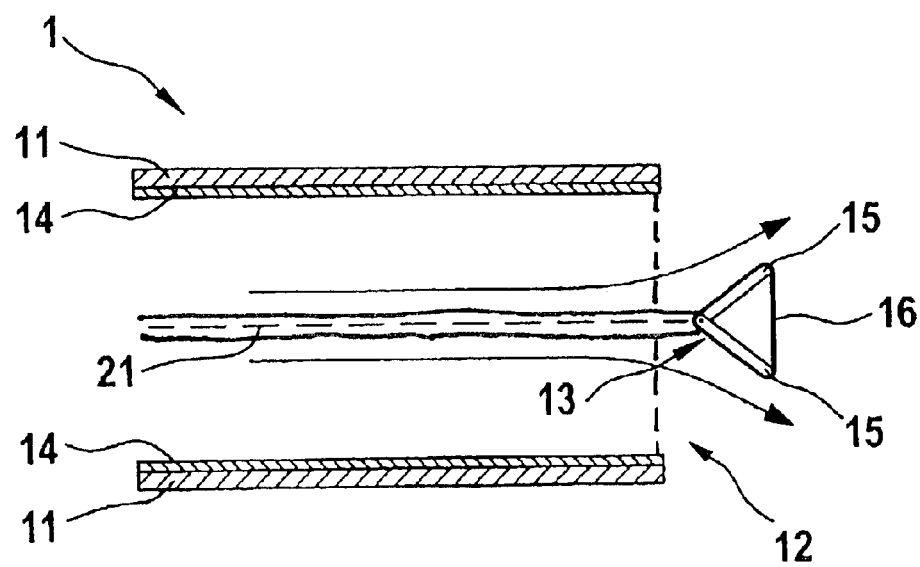
FIG. 5 shows a schematic illustration of an air outlet nozzle with a displacer which can be changed in shape and with a diffuse air jet.

FIGS. 4 and 5 show an exemplary embodiment of the air outlet nozzle 1 with a displacer which can be changed in shape. The air outlet nozzle 1 is constructed in the manner described above, but here the nozzle mouth element 14 is arranged on the inside in the nozzle housing 11. The displacer 13 is connected to the nozzle mouth element 14 via connecting webs and can be displaced in the axial direction by movement of the nozzle mouth element 14.

The displacer 13 has two slats 15 which are arranged in the shape of a V and are connected pivotably to each other. The pointed end of the slats arranged in the shape of a V points towards the flow into the interior of the air outlet nozzle 1. The slats 15 are covered by an elastic membrane 16 which forms the outer contour of the displacer 13. Pivoting of the slats enables the displacement effect of the displacer 13 to be changed by its cross section and therefore its flow resistance being changed.

FIG. 4 shows a position of the slats 15 with the displacer 13 having little flow resistance or cross section. The air jet emerges here basically axially out of the housing 11 of the air nozzle 1 and is influenced only to a small extent by the displacer 13. The slats 15 may be aligned substantially parallel to one another for minimum expansion of the jet.

FIG. 5 shows a position of the slats 15 with the displacer body 13 having a larger flow resistance or cross section. The air jet is deflected radially here by the displacer 13, with the result that it is expanded.

Arrangement of the displacer 13 outside the nozzle housing 11 results in only a small flow obstruction and therefore in only small additional flow losses in comparison with an air nozzle without a flow obstruction and through which flow can pass freely. Appropriate dimensioning and arrangement of the displacer 13 enables different expansions of the jet to be realized for different uses of the air outlet nozzle 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air outlet nozzle for a ventilation system, comprising:
   a nozzle housing which has an outlet mouth,
   a nozzle mouth element, and
   a displacer which is arranged in an airflow in a mouth region and is connected to the nozzle mouth element,
   wherein a position of the displacer is settable in an axial direction relative to the outlet mouth by the displacer being displaceable from a position in the outlet mouth into a position outside the nozzle housing, and
   wherein the displacer has an adjustable flow obstruction which is lesser in the position in the outlet mouth.

2. The air outlet nozzle according to claim 1, wherein the displacer has a higher flow obstruction in the position outside the nozzle housing.

3. The air outlet nozzle according to claim 1, wherein the displacer has an adjustable cross section.

4. The air outlet nozzle according to claim 1, wherein the displacer has an adjustable, variable shape.

5. The air outlet nozzle according to claim 1, wherein the displacer has adjustable slats or bars.

6. The air outlet nozzle according to claim 3, wherein the displacer has adjustable slats or bars.

7. The air outlet nozzle according to claim 5, wherein the slats are arranged in a shape of a V.

8. The air outlet nozzle according to claim 1, wherein the displacer has an elastic membrane.

9. The air outlet nozzle according to claim 3, wherein the displacer has an elastic membrane.

10. The air outlet nozzle according to claim 5, wherein the displacer has an elastic membrane.

11. The air outlet nozzle according to claim 8, wherein the membrane is designed for setting of differently shaped boundary surfaces or cross sections of the displacer.

12. The air outlet nozzle according to claim 6, wherein the slats or bars are designed for setting of differently shaped boundary surfaces or cross sections of the displacer.

13. The air outlet nozzle according to claim 1, wherein the displacer has adjustable air permeability.

14. The air outlet nozzle according to claim 3, wherein the displacer has adjustable air permeability.

15. The air outlet nozzle according to claim 5, wherein the displacer has adjustable air permeability.

16. The air outlet nozzle according to claim 8, wherein the displacer has adjustable air permeability.

17. The air outlet nozzle according to claim 13, wherein the displacer has air permeability which is homogeneous over the cross section.

18. The air outlet nozzle according to claim 13, wherein the displacer has air permeability which can be set differently in locally delimited areas.

19. The air outlet nozzle according to claim 13, wherein the displacer has a plurality of louvers or perforated plates which can be displaced relative to one another.

20. The air outlet nozzle according to claim 13, wherein the nozzle mouth element can be drawn out of the nozzle housing in an axial direction by the nozzle mouth element having side walls which are designed in such a manner that the nozzle mouth element has substantially the same cross section as the nozzle housing, with slightly larger or smaller dimensions, and the side walls are guided in a manner such that the side walls bear in a form-fitting manner on walls of the nozzle housing.

21. The air outlet nozzle according to claim 13, wherein the nozzle mouth element can be drawn out of the nozzle housing in an axial direction by the nozzle mouth element being mounted displaceably in the nozzle housing via a rail, the rail being arranged between the nozzle housing wall and nozzle mouth element or along a central longitudinal axis at a central point in the nozzle housing.

22. The air outlet nozzle according to claim 20, wherein the side walls of the nozzle mouth element have, in a region of the displacer, cutouts which are designed for radial exit of air.

23. The air outlet nozzle according to claim 22, wherein the cutouts of the nozzle mouth element are covered by the nozzle housing when the nozzle mouth element is pushed in and can have flow passing freely therethrough when the nozzle mouth element is drawn out.

24. The air outlet nozzle according to claim 13, wherein the displacer is arranged at an outer end of the nozzle mouth element and at least partially covers the cross section of the nozzle mouth element, and is arranged perpendicular with respect to the side walls thereof.

25. The air outlet nozzle according to claim 1, wherein the nozzle housing has an adjusting device for setting flow obstruction, air permeability, or position or shape of the displacer.

26. The air outlet nozzle according to claim 25, wherein the adjusting device has a manual control element or is connected to such which is designed for manual adjustment of the flow obstruction, the air permeability, or position or shape of the displacer.

27. The air outlet nozzle according to claim 25, wherein the adjusting device is designed for automatic adjustment of the flow obstruction, air permeability or position or shape of the displacer.

28. The air outlet nozzle according to claim 27, wherein the adjusting device has the automatic adjustment after a predeterminable time lapse or program sequences.

29. The air outlet nozzle according to claim 25, wherein the adjusting device operatively controls the flow obstruction, the air permeability, or position or shape of the displacer, in such a manner that, in every setting, loss in pressure caused by the displacer is of substantially the same magnitude, resulting in an outflowing quantity of air is constant.

30. A method of making an air outlet nozzle comprising making the air outlet nozzle of claim 1.

31. A method of using an air outlet nozzle comprising utilizing the air outlet nozzle of claim 1.

32. An air nozzle for vehicle ventilation, comprising:

a nozzle housing having an outlet, an outlet element, and a displaceable obstruction being arranged in an airflow path in a region of the outlet and connected to the outlet element, the obstruction being displaceable in an axial direction of the outlet to a position outside the nozzle housing from a position of the outlet, the obstruction providing an adjustable flow obstruction which is lesser in the position of the outlet.

33. A method of making an air outlet nozzle for a ventilation system of a vehicle, comprising:

providing a nozzle housing with an outlet mouth, arranging a displacer in an operable air flow path in a mouth region, and connecting the displacer to a nozzle mouth element so that a position of the displacer can be set in an axial direction relative to the outlet mouth by the displacer being displaceable from a position in the outlet mouth into a position outside the nozzle housing in use, wherein the displacer has an adjustable flow obstruction which is lesser in the position in the outlet mouth.

* * * * *